United States Patent [19]
Headley

[11] 4,029,338
[45] June 14, 1977

[54] TWIN TRAILING LINK REAR SUSPENSION SYSTEM

[75] Inventor: David B. Headley, Eaton Rapids, Mich.

[73] Assignee: General Motors Corporation, Detroit, Mich.

[22] Filed: Aug. 13, 1975

[21] Appl. No.: 604,345

[52] U.S. Cl. .................... 280/725; 180/73 TL; 267/15 R

[51] Int. Cl.² ........................................ B60G 1/02

[58] Field of Search ............ 180/73 R, 73 C, 73 D, 180/73 TL, 73 TT; 280/724, 725, 726; 267/15 R, 20 R, 20 C

[56] References Cited
UNITED STATES PATENTS

| 1,410,133 | 3/1922 | Starr | 180/73 R |
| 2,078,034 | 4/1937 | Smith | 180/73 R |
| 2,182,248 | 12/1939 | Chayne | 180/73 R |
| 2,367,817 | 1/1945 | Brown | 180/73 R |
| 2,732,903 | 1/1956 | Chayne | 280/724 |
| 2,746,766 | 5/1956 | Nallinger | 180/73 R |
| 3,042,424 | 7/1962 | Davis | 180/73 R |
| 3,177,006 | 4/1965 | Knight | 180/73 R |
| 3,259,201 | 7/1966 | Allison | 180/73 |
| 3,294,191 | 12/1966 | Cauvin | 180/73 |
| 3,333,866 | 8/1967 | Cuskie | 280/725 |

Primary Examiner—Joseph F. Peters, Jr.
Assistant Examiner—John A. Carroll
Attorney, Agent, or Firm—John P. Moran

[57] ABSTRACT

A twin trailing link suspension system for nonsteerable solid rear axles wherein each link has a one-point connection with the vehicular frame and a vertically aligned two-point connection with the rear axle for reduced weight and complexity.

3 Claims, 4 Drawing Figures

TWIN TRAILING LINK REAR SUSPENSION SYSTEM

This invention relates generally to vehicular rear axle suspension systems and, more particularly, to trailing link type rear suspension systems.

Heretofore it has been customary to utilize two sets of upper and lower links between the frame and a nonsteerable rear axle, and, depending upon their longitudinal direction, possibly combining therewith a lateral stabilizer or DeDion bar. While such four- and five-link arrangements have performed satisfactorily, it is advantageous to reduce the weight and complexity thereof, while providing an efficient sway control feature therefor, as well as roll oversteer and/or understeer adjustment means.

Accordingly, a general object of the invention is to provide an improved trailing link suspension system for nonsteerable solid rear axles wherein the conventional four-link arrangement, with or without a lateral stabilizer bar, is replaced by a lighter and simpler twin trailing link system.

Another object of the invention is to provide such a twin trailing link rear suspension system wherein each link is connected by a one-point connection at the leading end thereof to the vehicular frame, and by a two-point connection at the trailing end thereof.

A further object of the invention is to provide a twin trailing link rear suspension system wherein each link extends from a side of a vehicular frame rearwardly to the rear axle, to which it is connected by bifurcated ends extending both above and below the axle adjacent the midpoint of the overall length thereof.

Still another object of the invention is to provide a twin trailing link rear suspension system wherein each link is formed substantially in the shape of a Y, with each of the three ends thereof having a suitable elastomeric bushing mounted thereon and adapted to provide impact dampening when fixedly connected with brackets mounted on the side rail of the vehicular frame and with vertically aligned upper and lower brackets mounted on the rear axle.

These and other objects and advantages of the invention will be apparent when reference is made to the following description and accompanying drawings, wherein.

Figure 1:
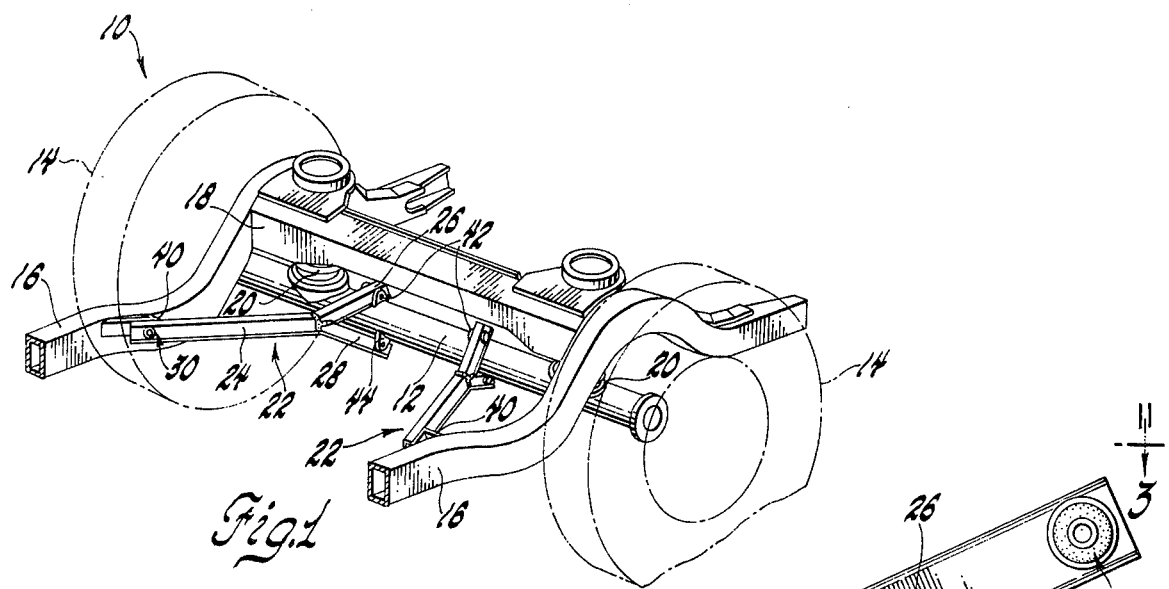
FIG. 1 is a fragmentary perspective view of the rear frame and axle portion of a vehicle embodying the invention.
Figure 2:
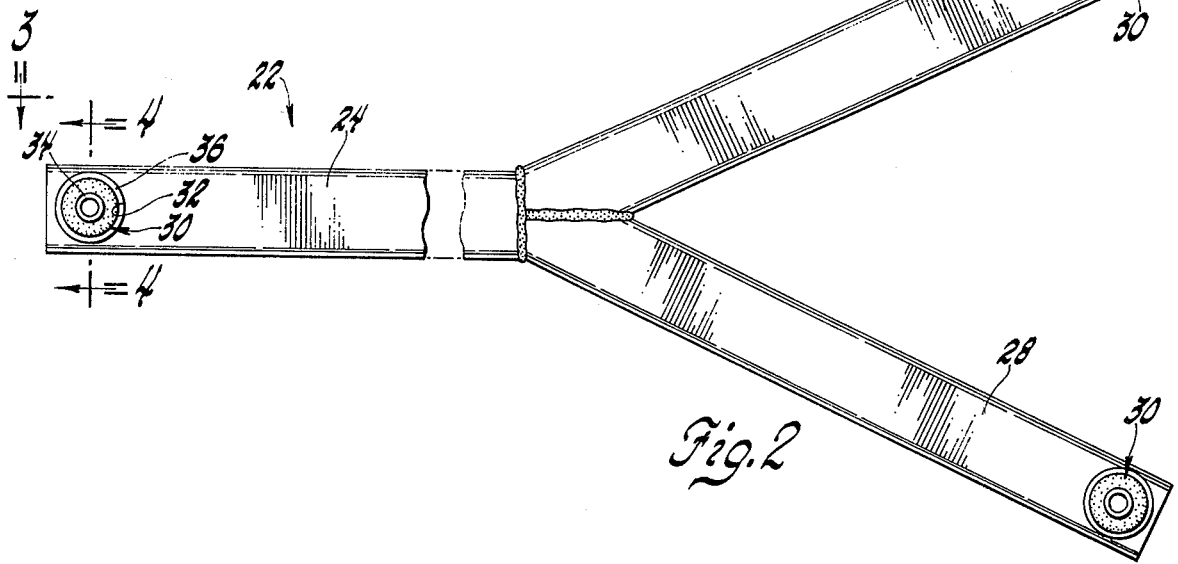
FIG. 2 is an enlarged side elevational view of the inventive trailing link embodied in the invention.
Figure 3:
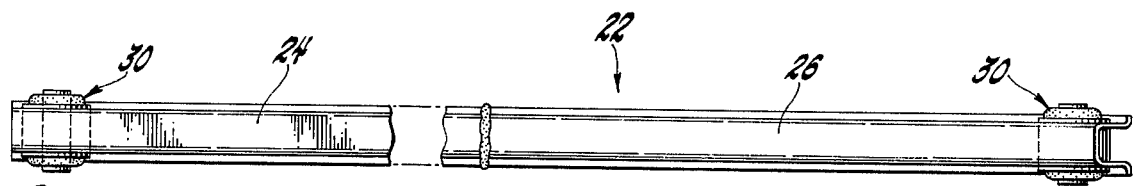
FIG. 3 is a plan view taken along the plane of line 3—3 of FIG. 2, and looking in the direction of the arrows.

Referring now to the drawings in greater detail, FIG. 1 illustrates a vehicular rear suspension system 10 including a solid, nonsteerable rear axle 12 having wheels 14 mounted on the ends thereof and being operatively connected to the side rails 16 and an interconnecting rear cross-rail 18 of a vehicular frame by means of a pair of coil springs 20 mounted between the axle 12 and the cross-rail 18 adjacent the respective ends thereof.

A trailing link 22, illustrated as including a main arm 24 and bifurcated or Y-shaped arms 26 and 28 secured to an end of the main arm 24 by any suitable means, such as welding, is adapted to being connected between each side rail 16 and the axle 12, in a predetermined angular relationship with respect to a verticle plane through the axis of the axle 12. Each arm 24, 26, and 28 is shown formed as a channel member having an upside-down U shape. The arms could, of course, be formed in other shapes, such as in a tubular configuration, if desired.

Figure 4:
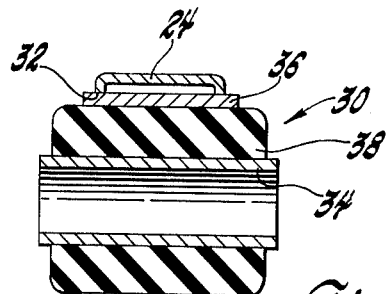
FIG. 4 is an enlarged cross-sectional view taken along the plane of line 4—4 of FIG. 2, and looking in the direction of the arrows.

A rubber bushing assembly 30 (FIG. 4) is press-fitted into an opening 32 formed adjacent the free ends of each of the arms 24, 26, and 28. The bushing assembly 30 may consist of inner and outer metal sleeves 34 and 36, respectively, with an elastomeric ring 38 integrally molded or fitted therebetween for impact dampening or isolation characteristics. Suitable fastener means, such as a bolt [not shown], is mounted through the inner sleeve 34 of the main arm bushing assembly 30 for securing the arm 24 to a suitable triangular bracket 40 (FIG. 1) welded or otherwise secured to an inner surface of each side rail 16 adjacent the forward portion of the respective wheel 14. Suitable fastener means is also mounted through each inner sleeve 34 of the bushing assemblies 30 mounted in the arms 26 and 28 for securing such arms to vertically aligned upper and lower support abutments or brackets 42 and 44, respectively, secured to the axle 12 predetermined distances from the midpoint of the length thereof, depending upon the overall length of each link 22 and the angular relationship thereof with the axis of the rear axle 12.

It should be apparent that the above-described three-point contact arrangement of the twin trailing links serves to prevent the axle from rotating about its axis, and helps locate the axle both laterally and fore-and-aft. It also serves as a means for bracing the rear portion of the vehicle against sway. Additionally, the main arm 24 may be mounted on the side rail 16 so as to extend horizontally, slightly upwardly, or slightly downwardly toward the axle axis, thereby providing a means for effecting roll oversteer or roll understeer, as desired, for turning operations.

It should also be apparent that for various vehicular and/or trailer applications, the twin trailing links 22 may be mounted so as to extend from the axle rearwardly, rather than forwardly, to the frame side rails.

It should additionally be apparent that the abovedescribed Y-shape for each trailing link 22 could vary between a T-shape and a V-shape, without changing the one-point connection with the side rail or the two-point connection with the axle.

Thus, while but one embodiment of the invention has been shown and described, other modifications thereof are possible.

I claim:

1. In a motor vehicle including a frame having side rails and an interconnecting rear cross-rail, a solid, nonsteerable rear axle having wheels mounted on the opposite ends thereof, and a pair of coil springs mounted between the axle and the frame, the improvement characterized by a rear suspension system including twin trailing links mounted between the rear axle and respective side rails at a predetermined angle with respect to the vehicular longitudinal axis and extending in a direction either fore or aft the rear axle, each of the twin trailing links including a main arm having vertically diverging arms formed on one end thereof, an opening formed adjacent the free end of each of the main and diverging arms, a bushing assembly mounted in each of the openings, fastener means mounted through each of the bushing assemblies for pivotally securing the main arm to the inner surface of the adjacent side rail and for pivotally securing the vertically diverging arms to upper and lower substantially vertically aligned portions of the axle at a predetermined axial location therealong.

2. In a motor vehicle including a frame having side rails and an interconnecting rear cross-rail, a solid, nonsteerable rear axle having wheels mounted on the opposite ends thereof, and a pair of coil springs mounted between the axle and the frame, the improvement characterized by a rear suspension system including twin trailing links mounted between the rear axle and respective side rails at a predetermined angle with respect to the vehicular longitudinal axis and extending forwardly from the rear axle at a predetermined angular relationship with a vertical plane through the axis thereof, each of the twin trailing links having three end-portions formed thereon, an opening formed adjacent each of the three end-portions, a bushing assembly mounted in each of the openings, a first mounting bracket secured to an inner surface of each of said side rails, second and third mounting brackets secured to respective upper and lower substantially vertically aligned portions of the axle at predetermined equal axial distances from the mid-length of the axle, a fastener mounted through each of the bushing assemblies for pivotally securing one end-portion to the first mounting bracket on the adjacent side rail and for pivotally securing the other two end-portions to the second and third mounting brackets on the axle.

3. In a motor vehicle including a frame having side rails and an interconnecting rear cross-rail, a solid, nonsteerable rear axle having wheels mounted on the opposite ends thereof, and a pair of coil springs mounted between the axle and the frame, the improvement characterized by a rear suspension system including twin trailing links mounted between the rear axle and respective side rails extending forwardly from the rear axle at a predetermined angular relationship with a vertical plane through the axis thereof, each of the twin trailing links including a main arm having vertically diverging arms formed on one end thereof, an opening formed adjacent the free end of each of the main and vertically diverging arms, a bushing assembly mounted in each of the openings, a first mounting bracket secured to an inner surface of each of said side rails, second and third mounting brackets secured to respective upper and lower substantially vertically aligned portions of the axle at predetermined equal axial distances from the mid-length of the axle, a fastener mounted through each of the bushing assemblies for pivotally securing the main arm to the first mounting bracket on the adjacent side rail and for pivotally securing the vertically diverging arms to the second and third mounting brackets on the axle.

* * * * *